(12) United States Patent
Günther et al.

(10) Patent No.: US 7,347,634 B2
(45) Date of Patent: Mar. 25, 2008

(54) OPTO-ELECTRICAL MODULE FOR OPTICAL SIGNALS FROM AT LEAST TWO OPTICAL DATA CHANNELS FOR ARRANGING ON A MAIN CIRCUIT BOARD OF A COMPONENT ASSEMBLY AND OPTO-ELECTRICAL COMPONENT ASSEMBLY

(75) Inventors: Peter Uwe Günther, Berlin (DE); Jörg-Reinhardt Kropp, Berlin (DE)

(73) Assignee: Finisar Corporation, Sunnyvale, CA (US)

( * ) Notice: Subject to any disclaimer, the term of this patent is extended or adjusted under 35 U.S.C. 154(b) by 63 days.

(21) Appl. No.: 10/913,164

(22) Filed: Aug. 6, 2004

(65) Prior Publication Data

US 2006/0029336 A1 Feb. 9, 2006

(51) Int. Cl.
*G02B 6/36* (2006.01)

(52) U.S. Cl. .............................. 385/92; 385/88; 385/89; 385/94

(58) Field of Classification Search ................. 385/76, 385/78, 88–94, 139
See application file for complete search history.

(56) References Cited

U.S. PATENT DOCUMENTS 6,464,403 B1 * 10/2002 Koch et al. .................... 385/53
6,604,862 B2 * 8/2003 Rogge et al. .................. 385/56
6,682,230 B1 * 1/2004 Demangone et al. ......... 385/88
6,789,950 B1 * 9/2004 Loder et al. ................... 385/53
6,840,686 B2 * 1/2005 Jiang et al. .................... 385/92
6,952,532 B2 * 10/2005 Dair et al. ................... 398/139
7,116,912 B2 * 10/2006 Pang et al. .................. 398/139
7,142,748 B1 * 11/2006 Yang ............................ 385/30
7,194,183 B2 * 3/2007 Thornton et al. ........... 385/139
7,245,498 B2 * 7/2007 Togami et al. .............. 361/753
2004/0008954 A1 * 1/2004 Shaw et al. .................... 385/92
2005/0089281 A1 * 4/2005 Chiu et al. ..................... 385/92
2005/0135755 A1 * 6/2005 Kiani et al. .................... 385/78

* cited by examiner

*Primary Examiner*—Sung Pak
*Assistant Examiner*—Daniel J Petkovsek
(74) *Attorney, Agent, or Firm*—Workman Nydegger (57) ABSTRACT

The invention relates to an optoelectronic module for optical signals of two optical data channels for arrangement on a main circuit board of an assembly, having a housing, which has an underside for arrangement of the optoelectronic module on a main circuit board. The arrangement further includes a printed circuit board arranged in the housing, having a first optical coupling region and a second optical coupling region for the coupling of optical waveguides, wherein the first and second coupling regions are arranged on the printed circuit board. The first optical coupling region is arranged at a smaller distance from the underside of the housing than the second optical coupling region. The invention achieves an efficient utilization of the end area of an assembly.

20 Claims, 10 Drawing Sheets

OPTO-ELECTRICAL MODULE FOR OPTICAL SIGNALS FROM AT LEAST TWO OPTICAL DATA CHANNELS FOR ARRANGING ON A MAIN CIRCUIT BOARD OF A COMPONENT ASSEMBLY AND OPTO-ELECTRICAL COMPONENT ASSEMBLY

FIELD OF THE INVENTION

The present invention is directed to an optoelectronic module arrangement, and more particularly to an optoelectronic module configured to accommodate optical signals for two optical data channels in a space-efficient manner.

BACKGROUND OF THE INVENTION

In optical communication technology, large volumes of data are transmitted in complex networks, optoelectronic modules for a plurality of optical channels being used within a system. In particular, optoelectronic modules equipped with a transmission channel and a reception channel, so-called transceivers, are used for this purpose.

So-called small form factor (SFF) transceivers and small form factor pluggable (SFP) transceivers of small design are known. The transceivers may be of pluggable design (SFP transceivers) or be fixedly arranged in a housing on a main circuit board of an assembly of an optical communication system (SFF transceivers). The advantage of pluggable transceivers is that they can subsequently be inserted into a system and be exchanged simply and the system can thus be adapted simply to the respective stipulations of the optical network.

The known transceivers have, in addition to an optoelectronic transmission module and an optoelectronic reception module, an internal printed circuit board that runs parallel to the optical axis of the transceiver and contains electronic circuits for the converter module, such as a driver module and/or a preamplifier module. The transceiver is arranged altogether on a main circuit board of an assembly of the optical communication system, which is electrically connected to the internal printed circuit board via a plug, for example. An SFP transceiver is described in DE 101 14 143 A1, for example.

Figure 10:
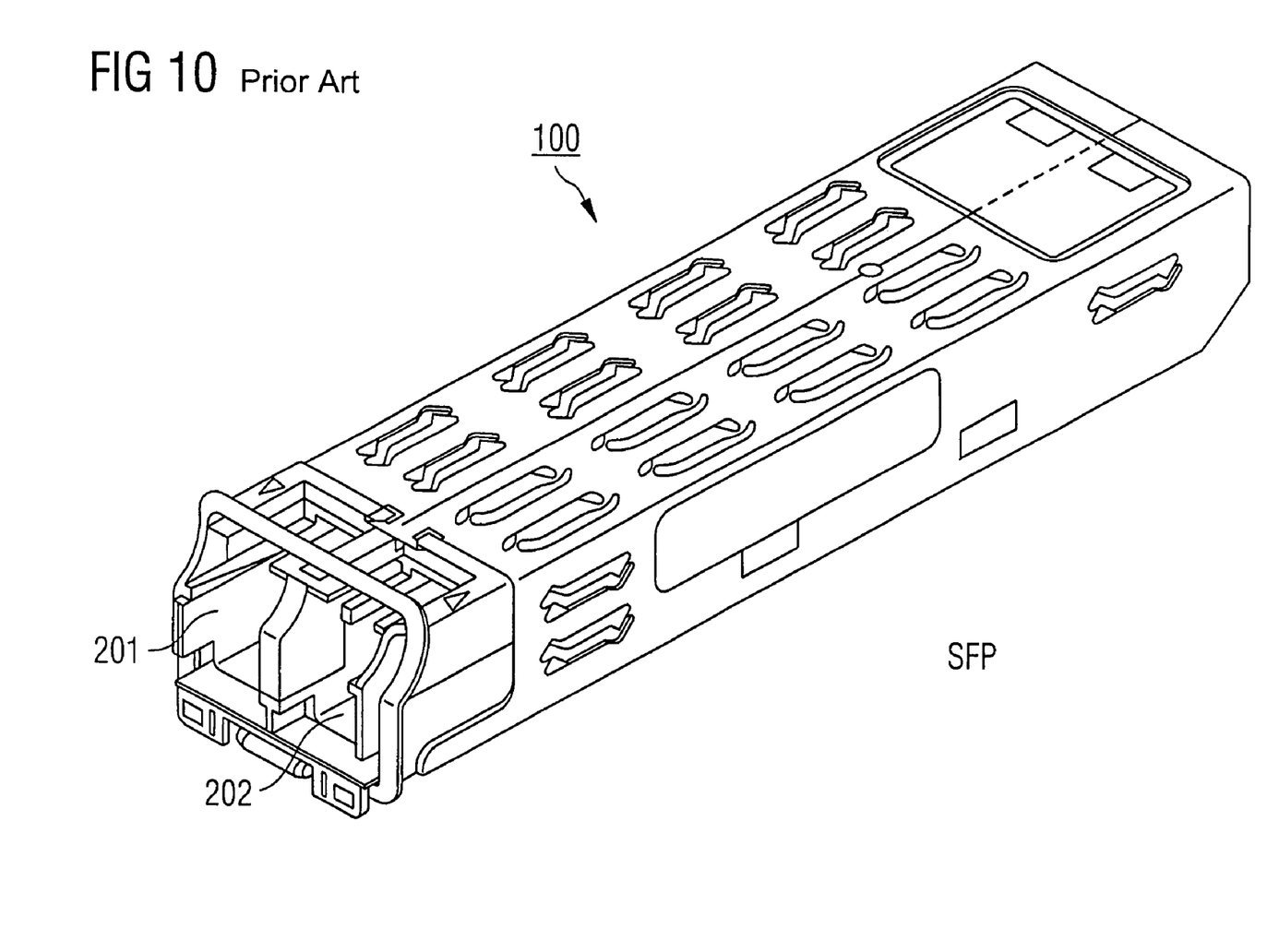
FIG. 10 shows a perspective view of a small form factor pluggable (SFP) transceiver according to the prior art.

FIG. 10 shows an SFP transceiver 100 according to the prior art, in which two receptacles 201, 202 for a respective optical plug are provided, by means of which a respective optical waveguide can be connected to an optoelectronic transmitter or receiver. The transceiver 100 serves for transmitting optical signals of two data channels.

Furthermore, bidirectional modules are known in which a transmitter and a receiver are incorporated in a common housing, for example a customary TO housing with a window cap. The transmitted and received optical signals are separated from one another by means of a beam-splitting element in the common housing. A plug bay for coupling an optical plug may be adjusted and fixed directly to such a TO housing. Moreover, such a module is small enough to be incorporated in a transceiver module of SFF or SFP design. However, the optoelectronic performance of such bidirectional main circuit boards is not outstanding. Since the transmission group and the reception group are seated in a common housing, electrical crosstalk can be avoided only with difficulty. The restricted sensitivity and the limited optical power have the effect that such modules are preferably used for point-to-point applications.

WO 02/095470 A1 discloses an electro-optical module for the transmission and/or reception of optical signals of at least two optical data channels, in which at least two optical waveguide sections having in each case at least one beveled end area are provided. The optical waveguide sections are positioned axially one behind the other at the beveled end areas in a small optical tube. For a specific optical channel, light is coupled in and light is coupled out at the beveled end area of an optical waveguide section perpendicular to the plugging axis of the optical waveguide. In this case, the end area is coated with a wavelength-selective filter for wavelength separation purposes. What is disadvantageous about this arrangement is that use in a transceiver module of SFF or SFP design is difficult to realize. In particular, the small tube with the optical waveguide cannot be arranged centrally in the module for space reasons.

A plurality of assemblies of optical communication systems have been arranged in switchgear cabinets or rack cabinets and the respective SPF transceivers have been arranged on the respective main circuit boards of the assemblies in such a way that the transceivers can be plugged on from the end side of the respective switchgear cabinet or rack cabinet parallel to the main circuit board. Furthermore, a clip has been provided at the end side of the transceivers, which clip has enabled the respective transceiver to be removed or latched on the rack cabinet or on the main circuit board.

Since the available area of the end sides of the switchgear or rack cabinets is limited, optoelectronic modules, in particular transceiver modules for the SFP design, are sought which make use of the available area efficiently and enable a high number of optical channels to be coupled in or out per unit area. Furthermore, the intention is to ensure that the optoelectronic modules can be exchanged simply in conjunction with reliable operation.

SUMMARY OF THE INVENTION

The invention relates to an optoelectronic module for optical signals of two optical data channels for arrangement on a main circuit board of an assembly. The optoelectronic module has a housing, which has an underside for the arrangement of the optoelectronic module on a main circuit board. A printed circuit board is arranged in the housing and a first optical coupling region and a second optical coupling region for the coupling of optical waveguides are provided, the first and second coupling regions being arranged on the printed circuit board. The first optical coupling region is arranged at a smaller distance from the underside of the housing than the second optical coupling region.

Printed circuit board is to be understood to mean any customary circuit carrier on which circuit components can be fitted. It is to be understood to include, in particular, flexible printed circuit boards, so-called flexboards.

This arrangement of the two optical coupling regions at a differing distance from the underside of the housing, that is to say one above the other with respect to the underside of the housing, makes it possible to reduce the width of the optoelectronic module on the main circuit board since now two optical coupling regions are arranged on a width on which usually only one optical coupling region is provided. As a result of this, the end area present in a switchgear cabinet is utilized better because twice the number of optical channels can thus be arranged on the same area. For this purpose, the width of the optoelectronic module is advantageously less than or equal to the width of an SFP transceiver and/or less than or equal to 7 mm. In this case, width is understood to mean the dimension of the housing at the end side of the underside of the housing of the optoelectronic module.

The optical coupling regions may thus be arranged in a plane which lies perpendicular to the plane of the underside of the housing and parallel to the plugging axis of the optoelectronic module. The printed circuit board may likewise be arranged in said plane. In an advantageous manner, the housing has, at an end side, a receptacle for an optical plug carrying two optical waveguides, and the optical coupling regions are arranged in such a way that the optical waveguides of an optical plug arranged in the receptacle can couple into the coupling regions. As a result of these geometrical orientations, it is possible for an optical plug carrying two optical wavegeuides to be inserted into the receptacle of the housing that the plane in which the two optical waveguides lie is perpendicular to the plane of the underside of the housing. What is achieved, in turn, as a result of these geometrical arrangements is that, on the width of an optical plug that is usually arranged horizontally, it is now possible to arrange two optical plugs that are arranged perpendicularly, thereby achieving a doubling of the optical channels that can be connected per unit area of the end area.

Plugging axis is understood to mean the axis of the optoelectronic module along which the optoelectronic module can be plugged into a guide cage described further below. The plugging axis furthermore corresponds to the axis along which an optical plug can be plugged into the optoelectronic module. This axis may likewise correspond to the axis of the largest longitudinal extent of the optoelectronic module.

In order to produce a complete optoelectronic module, an optoelectronic transmission component and an optoelectronic reception component may be arranged on the printed circuit board, the optoelectronic transmission component and the optoelectronic reception component being arranged one above the other with respect to the underside of the housing.

For the electrical coupling of the optoelectronic module to a main circuit board, the printed circuit board may have a contact region at its end opposite to the optical coupling regions, which contact region can be inserted into a direct contact plug arranged on a main circuit board. In this case, the contact region advantageously lies in a plane perpendicular to the underside of the housing. Simple access to the contact region may be achieved through a cutout in the housing.

A simple exchange of the optoelectronic module and also a mechanically secure connection of the optoelectronic module to an assembly may be achieved by locking means arranged on the housing. In this case, the locking means advantageously comprise an elastic locking lever and an engagement region, which is arranged on the locking lever and can be moved with the latter, for engagement into an engagement opening of the assembly. Automatic locking is achieved by virtue of the fact that the locking lever pretensions the engagement region in the locking direction. In order to prevent inadvertent unlocking during the plugging or removal of optical plugs, an unlocking barrier may be provided on the locking lever, said unlocking barrier preventing unlocking when the optical plug has been pushed in. An unlocking barrier that is to be produced cost-effectively may be formed in such a way that it is supported on the housing of an optical plug pushed into the housing of the optoelectronic module. Therefore, the optoelectronic module can be unlocked only when the optical plug has been withdrawn. A cost-effective unlocking barrier is achieved by virtue of the fact that the unlocking barrier is arranged on that side of the locking lever which is opposite to the engagement region.

In order to avoid destruction of the locking lever by the application of too much force when exerting pressure on the locking lever, the locking lever is wider in its actuable end region than a gap—situated between two housing jaws—for receiving a locking lever of an optical plug.

In order to fix said optoelectronic module on an assembly, it is possible for said optoelectronic module to be pushed into a guide cage arranged on an assembly and to be locked with said guide cage by means of the locking means.

The invention furthermore relates to an optoelectronic module for arrangement on a main circuit board, having a housing, which has a receptacle for an optical plug, and at least one optoelectronic component with an optical coupling region for the coupling of an optical waveguide led in an optical plug. Furthermore, provision is made of a locking lever for locking the housing on an assembly, an unlocking barrier being arranged on the locking lever, so that the locking lever cannot be actuated in the unlocking direction when the optical plug has been pushed in.

The unlocking barrier is advantageously supported on an optical plug pushed into the receptacle, in order thus to prevent unlocking when the plug has been inserted.

In this case, the locking lever is preferably elastic and comprises an engagement region, which is arranged on the locking lever and can be moved with the latter, for engagement into an engagement opening of the assembly. For the simple and cost-effective design of the unlocking barrier, the latter is advantageously arranged on that side of the locking lever which is opposite to the engagement region.

The invention furthermore relates to an optoelectronic assembly having a main circuit board, a guide cage arranged on the main circuit board and serving for receiving at least one of the optoelectronic modules described above, and also such an optoelectronic module. In order to efficiently utilize the limited end area of the assembly, the guide cage advantageously serves for receiving two optoelectronic modules. In this case, the guide cage may have a width on the main circuit board which corresponds to the corresponding width of a small form factor pluggable transceiver.

For reliably guiding an optoelectronic module, the guide cage has at least one guide lip for guiding an optoelectronic module pushed into the guide cage.

For making electrical contact with an optoelectronic module in a simple manner, at least one direct contact plug for making electrical contact with an optoelectronic module pushed into the guide cage may be arranged on the main circuit board.

BRIEF DESCRIPTION OF THE DRAWINGS

The invention is explained in more detail below on the basis of two exemplary embodiments with reference to the figures, in which.

DESCRIPTION OF TWO PREFERRED EXEMPLARY EMBODIMENTS

In the following description of the figures, the same reference symbols are used for the same structural parts throughout the figures.

Figure 1:
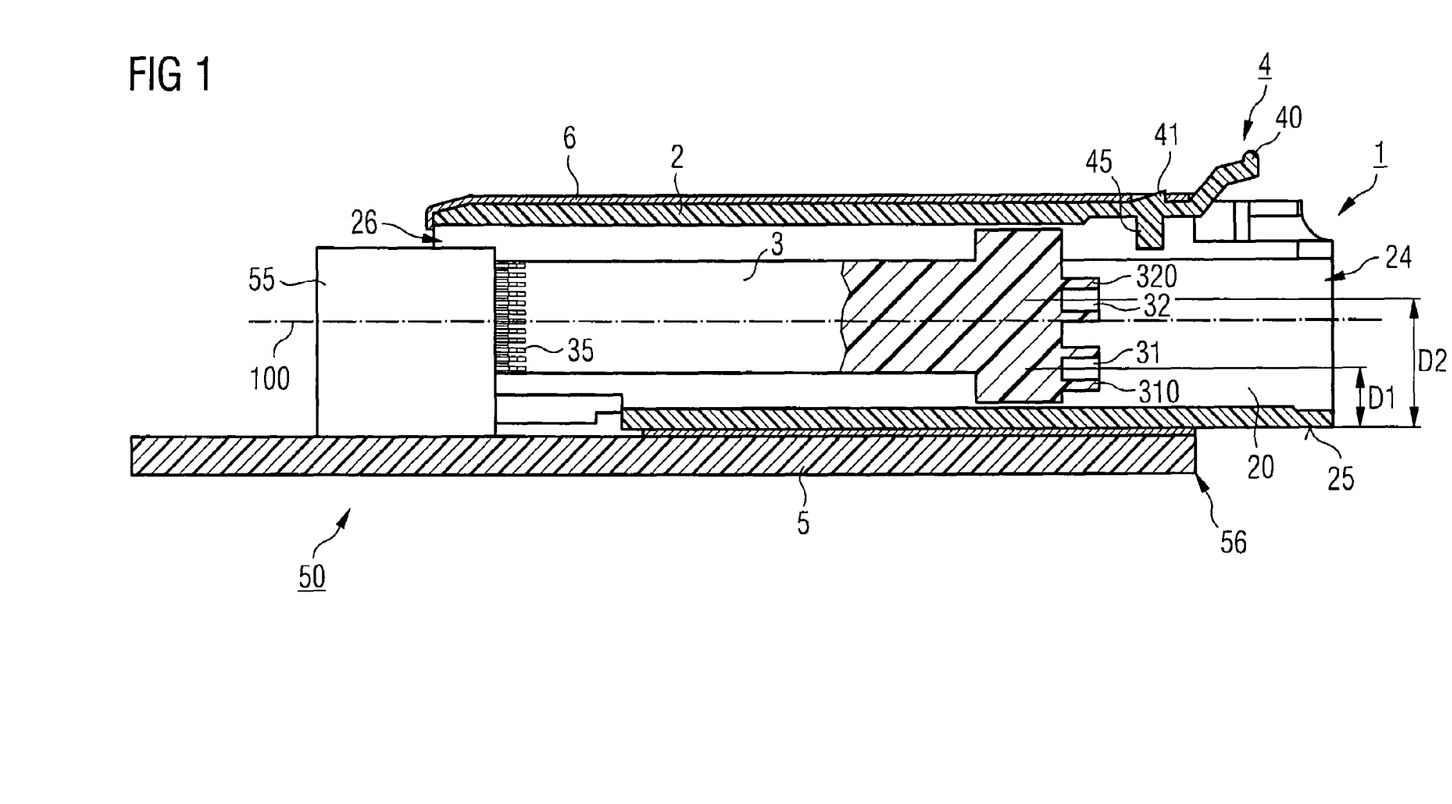
FIG. 1 shows a cross section through an optoelectronic module which is pushed into a guide cage and arranged on a main circuit board of an assembly.

FIG. 1 shows a sectional illustration of an optoelectronic module 1 arranged on a main circuit board 5 of an assembly 50 of an optical communication system. In this case, the main circuit board 5 of the assembly 50 of the optical communication system is advantageously arranged in, a rack cabinet (not illustrated here), the edge 56 of the main circuit board 5 pointing in the direction of the end side of the rack cabinet from which the assembly 50 is accessible.

The optoelectronic module 1 has a housing 2 having an underside 25, the underside 25 serving for the arrangement of the housing 2 or the optoelectronic module 1 on the main circuit board 5 of the assembly 50. In this case, the underside 25 of the housing 2 is in contact with the main circuit board 5 directly or indirectly, for example by arrangement on an intermediate element or a part of the guide cage 6.

A printed circuit board 3 oriented parallel to the plugging axis 100 of the optoelectronic module 1 is arranged in the housing 2 of the optoelectronic module 1, a first optical coupling region 31 and a second optical coupling region 32 for the coupling of optical waveguides (not shown here) being provided on said printed circuit board. In the embodiment shown, said optical coupling regions 31, 32 are in each case formed within flanges 310, 320 in which optical waveguides or ferrules can be received. Therefore, as described further below for example with regard to FIG. 2, the coupling of an optical waveguide may be effected unerringly by inserting a ferrule carrying an optical waveguide into the respective flange 310, 320.

The first optical coupling region 31 is at a distance D1 from the underside 25 of the housing 2, said distance being smaller than the distance D2 of the second optical coupling region 32. Therefore, the second optical coupling region 32 lies above the first optical coupling region 31 with respect to the underside 25 of the housing 2 of the optoelectronic module 1. In this case, the optical coupling regions 31, 32 are arranged in a plane which lies perpendicular to the plane of the underside 25 of the housing 2 and parallel to the plugging axis 100 of the optoelectronic module 1.

The plugging axis 100 of the optoelectronic module 1 is defined by the plug-in direction of the optoelectronic module 1 into the guide cage 6. The plugging axis 100 is thus also parallel to the axes of the optical waveguides 71, 72 (shown for example in FIGS. 2 and 3) or the axes of the ferrules 310, 320 or parallel to the plug-in direction of the optical plug 7.

In the case where the optoelectronic module 1 is arranged on a main circuit board 5, therefore, the two optical coupling regions 31, 32 are arranged one above the other and lie essentially in a plane which is perpendicular to the plane of the main circuit board 5.

The plane of the printed circuit board 3 arranged in the housing 2 likewise lies perpendicular to the plane of the underside 25 of the housing 2 and parallel to the plugging axis of the thus also perpendicular to the plane of the main circuit board 5.

The fact that two planes are perpendicular to one another is to be understood here to mean that the normal vectors of the two planes are perpendicular to one another. The fact that a plane lies parallel to an axis is to be understood here to mean that the axis itself or an axis shifted parallel thereto lies in the plane.

The two optical coupling regions 31, 32 may be formed as the respective active regions of an optoelectronic transmission component and a reception component, but also as optical elements, for example as waveguides or lens optics into which an optical waveguide can be coupled. When formed as optical elements, the corresponding optoelectronic transducers lie further toward the rear on the printed circuit board 3 in the direction of the plugging axis 100. Furthermore, components that are not illustrated any further here, such as electronic circuits for the converter modules, driver modules and/or preamplifier modules, may be arranged on the printed circuit board 3.

The optical coupling regions 31, 32 enable light to be coupled from optical waveguides (not shown in this figure) into optoelectronic components provided on the printed circuit board 3 or light to be coupled from optoelectronic components provided on the printed circuit board 3 into optical waveguides. For this purpose, for example in order to form the optoelectronic module 1 as a transceiver, an optoelectronic transmission component and an optoelectronic reception component are provided on the printed circuit board 3 and can be used to convert the corresponding optical signals into electrical signals and the electrical signals into optical signals.

For the coupling of optical waveguides, the housing 2 has a receptacle 20 for receiving an optical plug. Such an optical plug may then be inserted into the receptacle 20 for the coupling of optical waveguides, as described further below with regard to FIG. 2. The receptacle 20 is arranged on an end side 24 of the housing 2, so that the optical plug can be pushed into the receptacle 20 through an opening in the end side 24 of the housing.

FIG. 1 shows that the housing 2 or the optoelectronic module 1 is arranged on a main circuit board 5 of an assembly 55. This arrangement is achieved here mechanically by means of a guide cage 6 arranged on the main circuit board 5, into which guide cage the optoelectronic module 1 can be pushed parallel to the main circuit board 5. The underside 25 of the housing 2 of the optoelectronic module 1 is thus in direct contact with the surface of the main circuit board 5.

Electrical contact is made between the optoelectronic module 1 and the main circuit board 5 or the assembly 55 by means of a direct contact plug 55 arranged on the main circuit board 5, into which direct contact plug a contact region 35 of the printed circuit board 3 can be pushed. The contact region 35 of the printed circuit board 3 lies on that side of the printed circuit board 3 which is opposite to the optical coupling regions 31, 32 in the direction of the plugging axis 100 of the optoelectronic module 1. In this case, the guide cage 6 and the direct contact plug 55 are dimensioned and arranged in such a way that an electrical connection between the contact region 35 of the printed circuit board 3 and the direct contact plug 55 is produced when the optoelectronic module 1 has been completely pushed into the guide cage 6. A cutout 26 in the housing 2 enables access to the contact region 35 and at the same time protection of the contact region 35 in the non-installed state of the optoelectronic module 1.

In the position in which it is completely pushed into the guide cage 6 as shown in FIG. 1, the optoelectronic module 1 is locked with the assembly 55 or the guide cage 6 arranged on the main circuit board 5 by means of a locking means 4. The locking means 4 has an elastic locking lever 40, on which an engagement region 41 is provided, which can be moved together with the locking lever 40. The engagement region 41 engages into an engagement opening 61 (see, e.g., FIGS. 4 and 7) of the guide cage 6 and thus prevents the optoelectronic module 1 from being drawn out of the guide cage 6. For unlocking purposes, the engagement region 41 can be moved out of the engagement opening 61 by movement of the locking lever 40, so that the optoelectronic module 1 is unlocked and can be drawn out of the guide cage 6. In this case, the elastic locking lever 40 pretensions the engagement region 41 in the locking direction, so that the optoelectronic module 1 remains locked with the guide cage 6 in the state in which it is completely pushed into said guide cage.

The locking lever 40 furthermore has an unlocking barrier 45 arranged on that side of the locking lever 40 which is opposite to the engagement region 41. The unlocking barrier 45 prevents the optoelectronic module 1 from being unlocked if an optical plug is plugged into the receptacle 20. The precise mode of action of the unlocking barrier 45 is illustrated in the following description of FIGS. 2 and 3.

Figure 2:
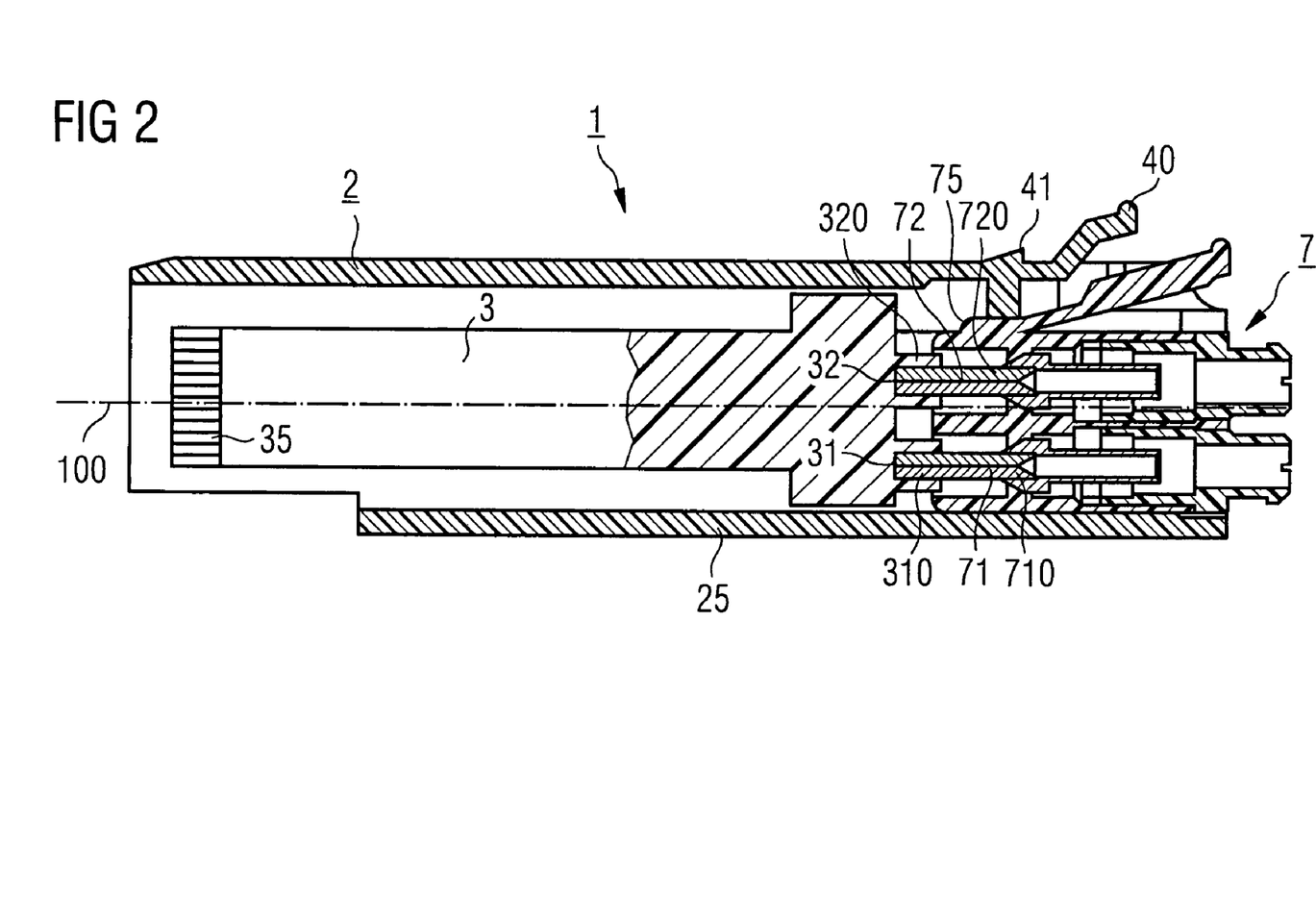
FIG. 2 shows a cross section through the optoelectronic module of FIG. 1 alone, in which an optical plug is connected to the optoelectronic module and two optical waveguides led in two ferrules are coupled to the optoelectronic module via said optical plug.
Figure 3:
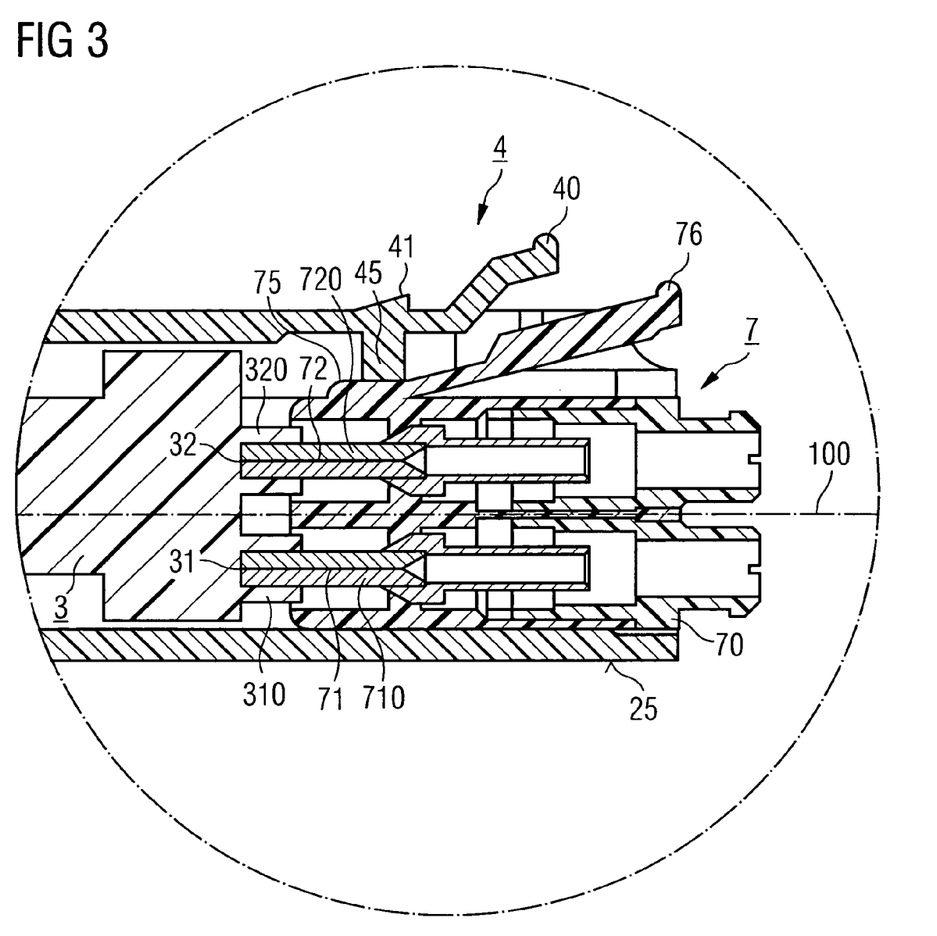
FIG. 3 shows an enlarged view of the region of FIG. 2 in which the optical plug is arranged and locking means for locking the optoelectronic module on the main circuit board and the optical plug on the optoelectronic module are provided.

FIG. 2 shows the optoelectronic module 1 of FIG. 1 alone, that is to say without main circuit board, guide cage and direct contact plug. The description of the structural parts that have already been illustrated in FIG. 1 is dispensed with here. For the sake of better clarity, FIG. 3 shows an enlarged detail from FIG. 2. FIGS. 2 and 3 are described jointly below.

In the state shown in FIGS. 2 and 3, an optical plug 7 carrying two optical waveguides 71, 72 is inserted into the optoelectronic module 1. In the last section of the optical waveguides 71, 72, the latter are led in a respective ferrule 710, 720 arranged on the optical plug 7. In this case, the optical waveguides 71, 72 or the ferrules 710, 720 are arranged in the optical plug 7 in such a way that the optical waveguides 71, 72 are in optical contact with the optical coupling regions 31, 32 of the optoelectronic module 1. In this case, the ferrules 710, 720 are inserted into the flanges 310, 320 of the optical coupling region 31, 32, thereby achieving an unerring optical coupling between the optical waveguides 71, 72 and the optical coupling regions 31, 32. The optical plug 7 is a duplex optical waveguide plug in which two fibers are arranged one above the other.

The optical plug 7 has a housing 70, in which the optical waveguides 71, 72 are led and which carries the ferrules 710, 720. The housing 70 has a locking lever 76, by means of which the optical plug 7 can be locked on the optoelectronic module 1 in a customary manner. In this case, the locking lever 76 lies in the plane running through the two optical waveguides, the actuation of the locking lever 76 likewise taking place in said plane.

The unlocking barrier 45—described further above—of the locking means 4 of the optoelectronic module 1 is supported on a surface 75 of the housing 70 of the optical plug 7 when the plug 7 has been pushed in. Consequently, it is not possible for the locking lever 40 of the optoelectronic module 1 to be pressed down when the optical plug 7 has been pushed in. This prevents the optoelectronic module 1 together with the optical plug 7 from being drawn out of an assembly because the wrong locking lever has inadvertently been pressed. It is thus ensured that the optical plug 7 is withdrawn first and only then can the optoelectronic module 1 be removed from the assembly if this is desired.

In the plugged-in state of the optical plug 7, the locking lever 40 of the optoelectronic module 1 and the locking lever 76 of the optical plug 7 lie on the same side of the optoelectronic module 1, namely on the side opposite to the underside 25 of the housing 2 of the optoelectronic module 1. In this case, the two locking levers 40, 76 lie one behind the other in the direction of the plugging axis 100.

Figure 4:
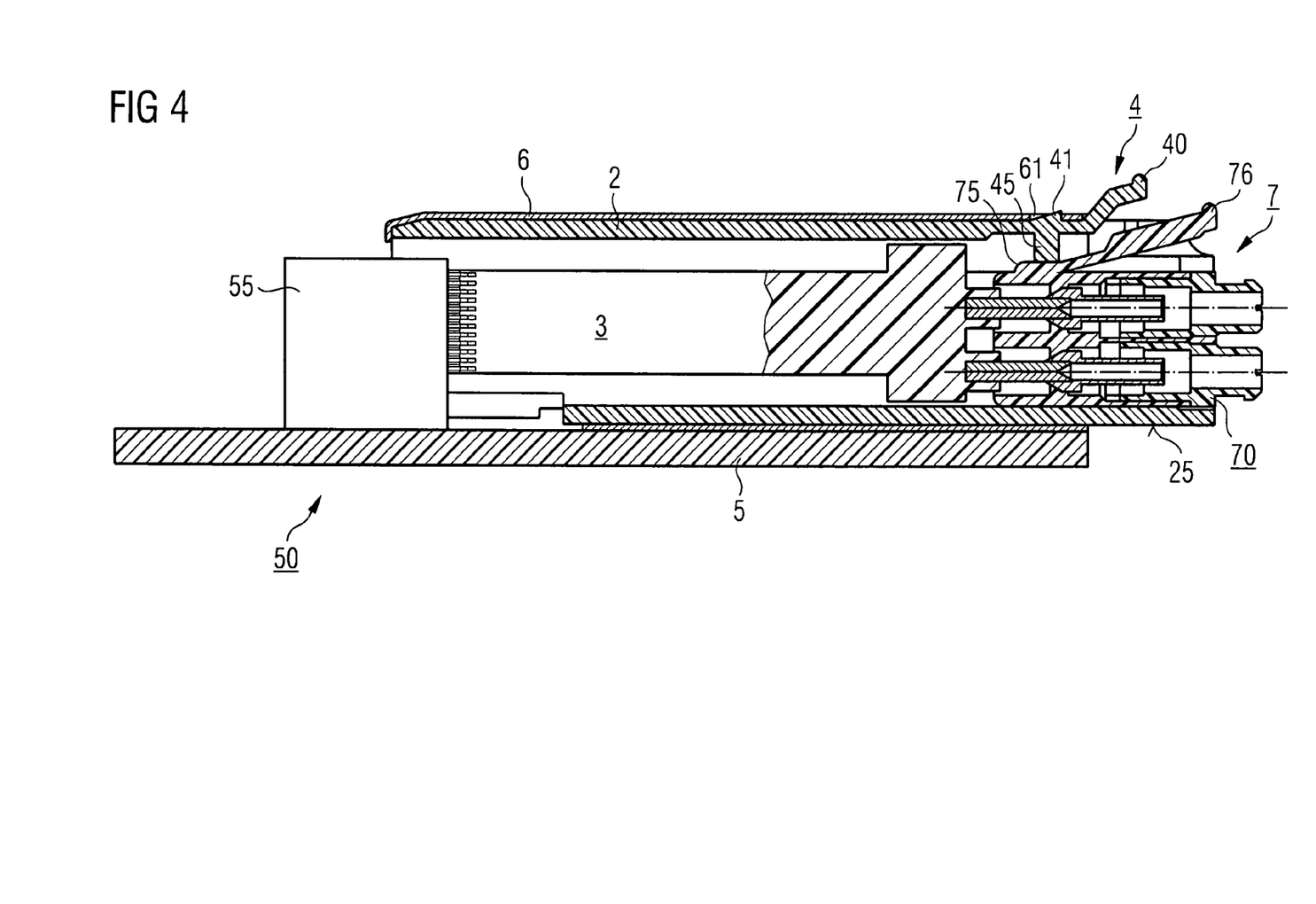
FIG. 4 shows a cross section through the optoelectronic module of FIGS. 1 to 3 in an arrangement on the main circuit board of the assembly, an optical plug being arranged on the optoelectronic module.

FIG. 4 shows the optoelectronic module of FIGS. 1 to 3 in the state in which it is plugged into the guide cage 6 fitted on the main circuit board 5 of the assembly 55. In this case, the plug 7 is now also plugged into the receptacle 20 of the housing 2 of the optoelectronic module 1.

FIG. 4 reveals that the engagement region 41 of the locking means 4 engages into the engagement opening 61 of the guide cage 6 and unlocking by actuation of the locking lever 40 is not possible since the unlocking barrier 45 is supported on a surface 75 of the housing 70 of the optical plug 7. The optoelectronic module 1 can be unlocked only if the optical plug 7 is drawn out and the unlocking barrier 45 is released again.

Figure 5:
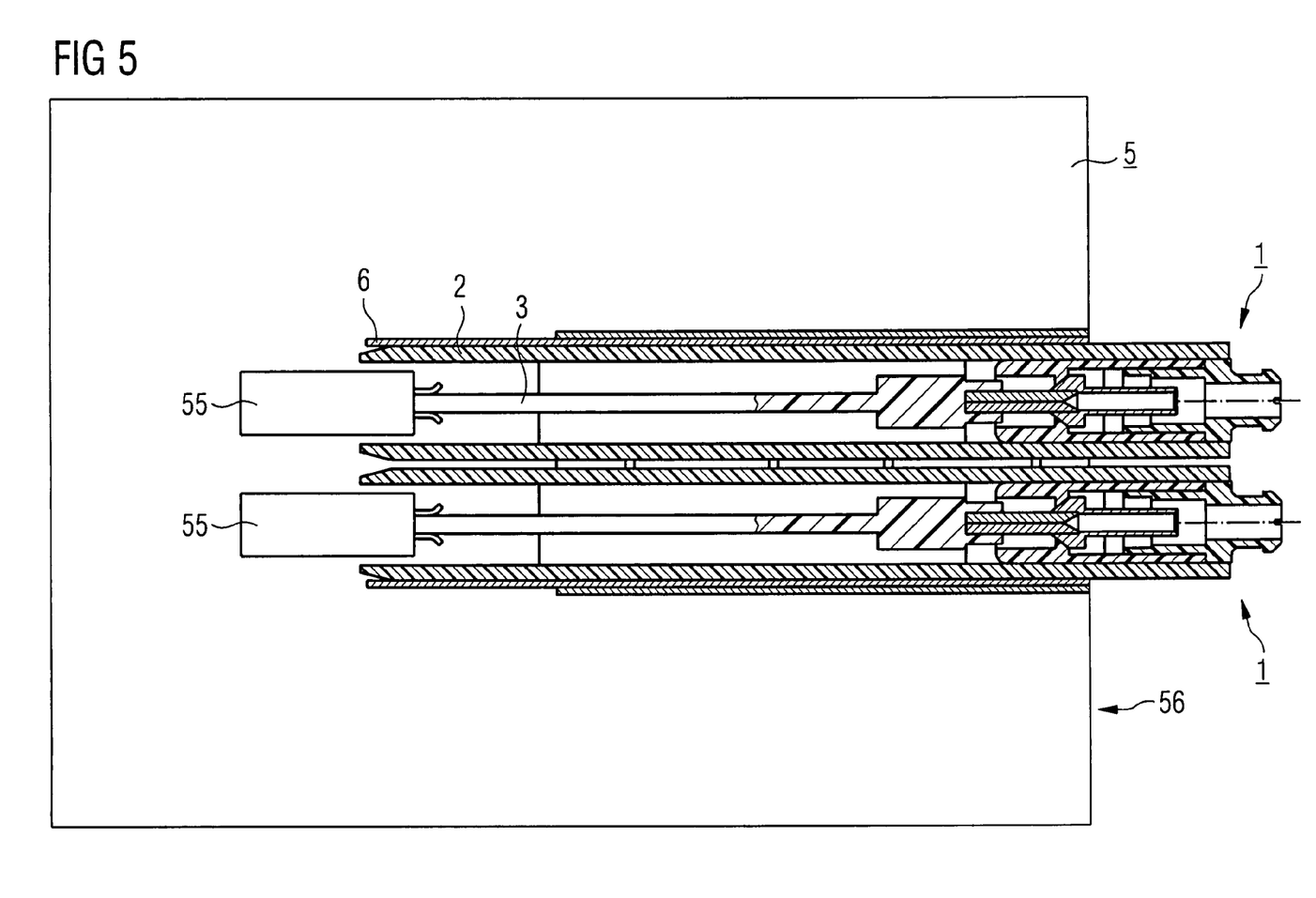
FIG. 5 shows a plan view of two optoelectronic modules of FIGS. 1 to 4 which are pushed into a common guide cage and thus arranged on the main circuit board of the assembly.

FIG. 5 shows a plan view of a guide cage 6 arranged on the main circuit board 5 of the assembly 55. Two optoelectronic modules 1 are pushed into the guide cage 6 one beside the other. In this case, the guide cage essentially has the width on the main circuit board 5 that a conventional SFP transceiver would have. The advantage of the particular arrangement of the optical coupling regions is manifested here. By virtue of this arrangement of the coupling regions in a manner configured one above the other, it is possible to halve the width of an optoelectronic module 1 compared with the width of a customary small form factor pluggable transceiver. Therefore, on the same basic area of the main circuit board 5 or the same area of the end side 56 of the assembly 55, it is possible to arrange two optoelectronic modules 1, that is to say twice the number compared with a customary SFP transceiver.

Figure 6:
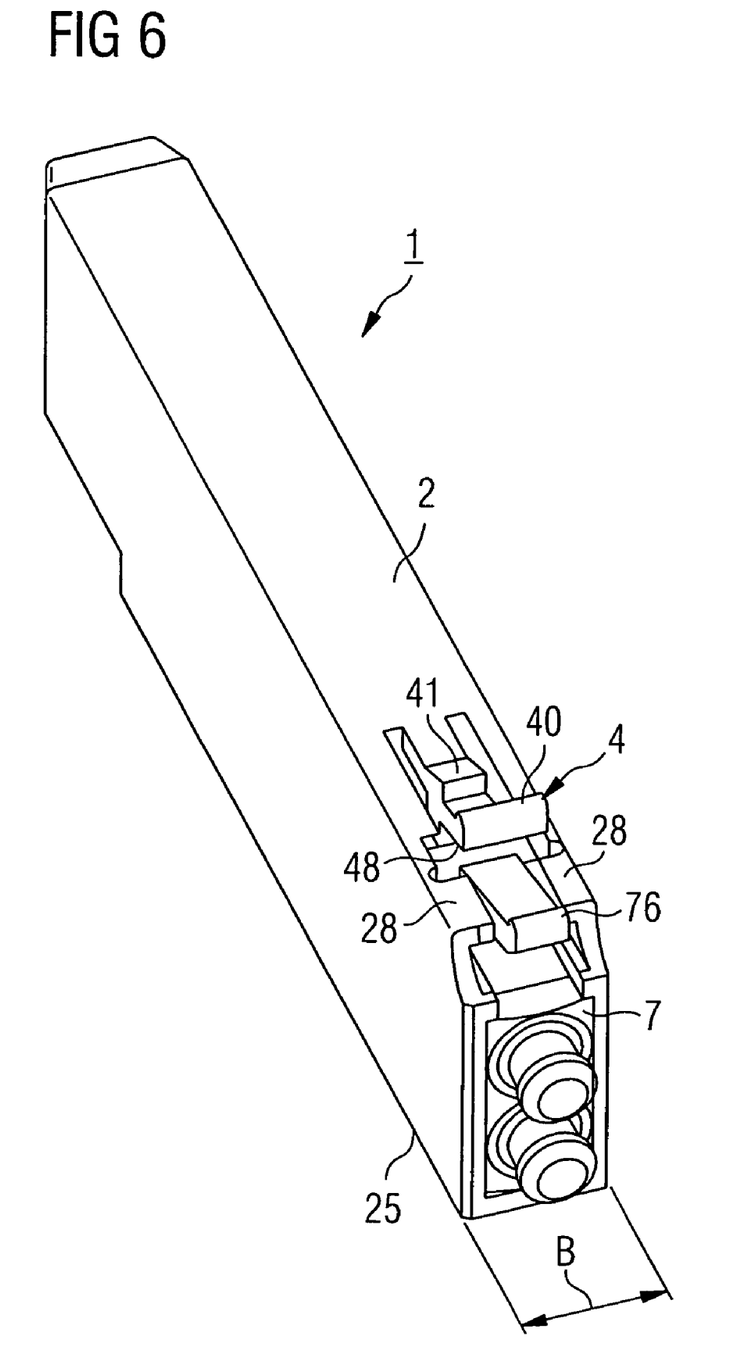
FIG. 6 shows a perspective external view of the optoelectronic module of FIGS. 1 to 5.

FIG. 6 shows the optoelectronic module in a perspective external view. The narrow, elongate design is discernible here, in the case of which an optical duplex plug 7 is arranged perpendicular to the underside 25 of the housing 2 of the optoelectronic module 1.

It can be discerned here that the outer region of the locking lever 40, which serves for the actuation of the locking lever 40, is wider than the housing jaws 28 arranged underneath. The two housing jaws 28 leave a slot free, through which the locking lever 76 of the optical plug 7 can be led.

What is achieved by this embodiment of the outer region of the locking lever 40 is that the locking lever 40 bears on the housing jaws 28 after a certain travel when it is pressed down. This prevents the locking lever 40 from being broken off if the optical plug 7 is removed and the locking lever 40 is actuated with too much force.

Figure 7:
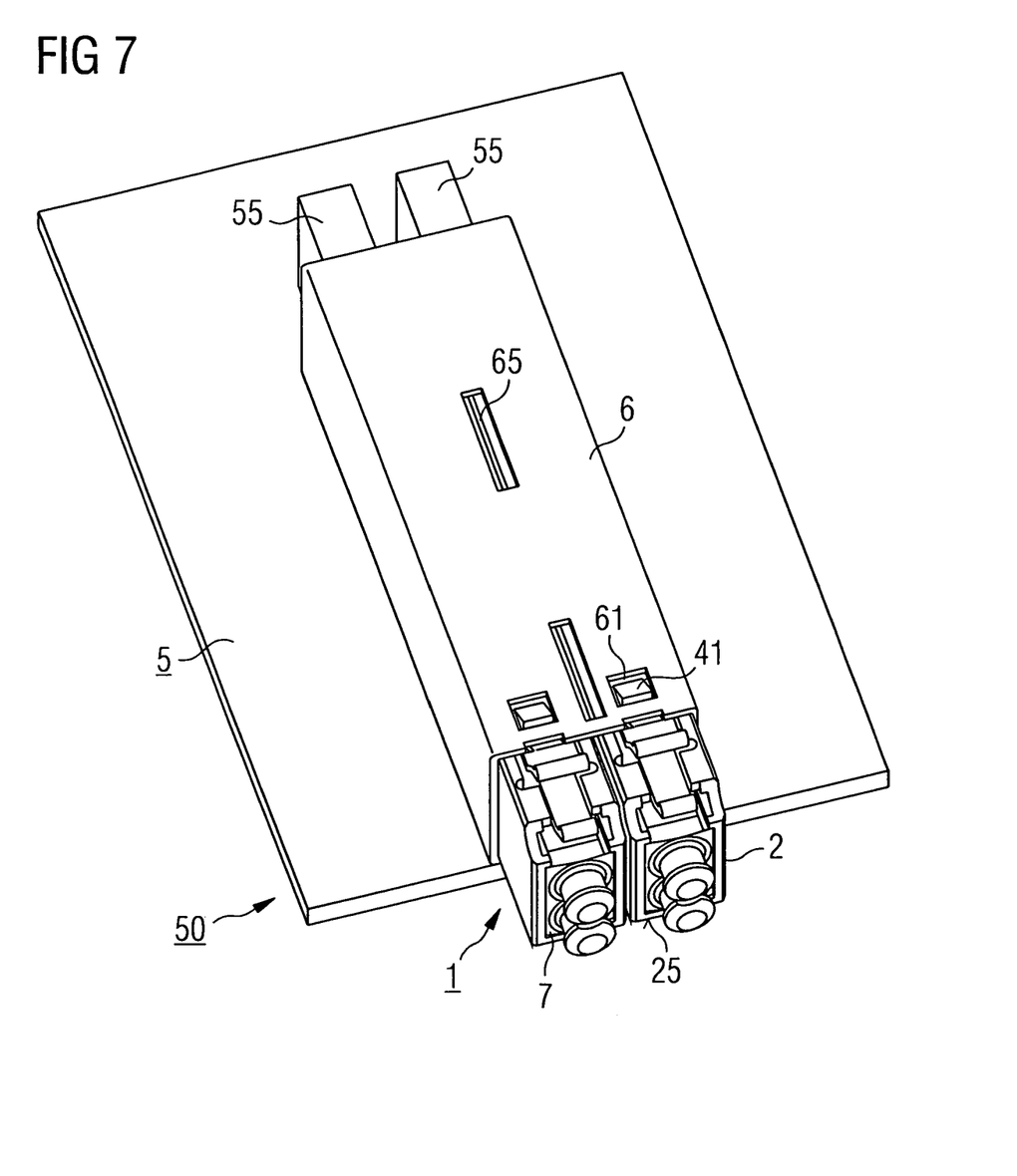
FIG. 7 shows a perspective external view of the arrangement of the two optoelectronic modules on the main circuit board of the assembly by pushing into the guide cage.

FIG. 7 shows a perspective illustration of two optoelectronic modules 1 pushed into a guide cage 6 arranged on the main circuit board 5. What can clearly be discerned here, first of all, is the arrangement of the optical coupling regions or the optical waveguides 71, 72 one above the other with respect to the underside 25 of the housing 2 of the optoelectronic modules 1. The optical duplex plug 7 is therefore in each case plugged in perpendicular to the underside 25 of the housing 2 of the optoelectronic module 1 or to the plane of the main circuit board 5.

Secondly, it is possible to discern the locking of the optoelectronic modules 1 in the guide cage 6 by the engagement of the engagement regions 41 of the locking means 4 into the engagement opening 61. The two optoelectronic modules 1 arranged next to one another are guided parallel to one another by guide lips 65 in the guide cage 6. The guide lips 65 may be arranged on the top side and the underside of the guide cage 6 and furthermore also make it possible for only an individual optoelectronic module 1 to be inserted into a guide cage 6 designed for two optoelectronic modules 1.

Figure 8:
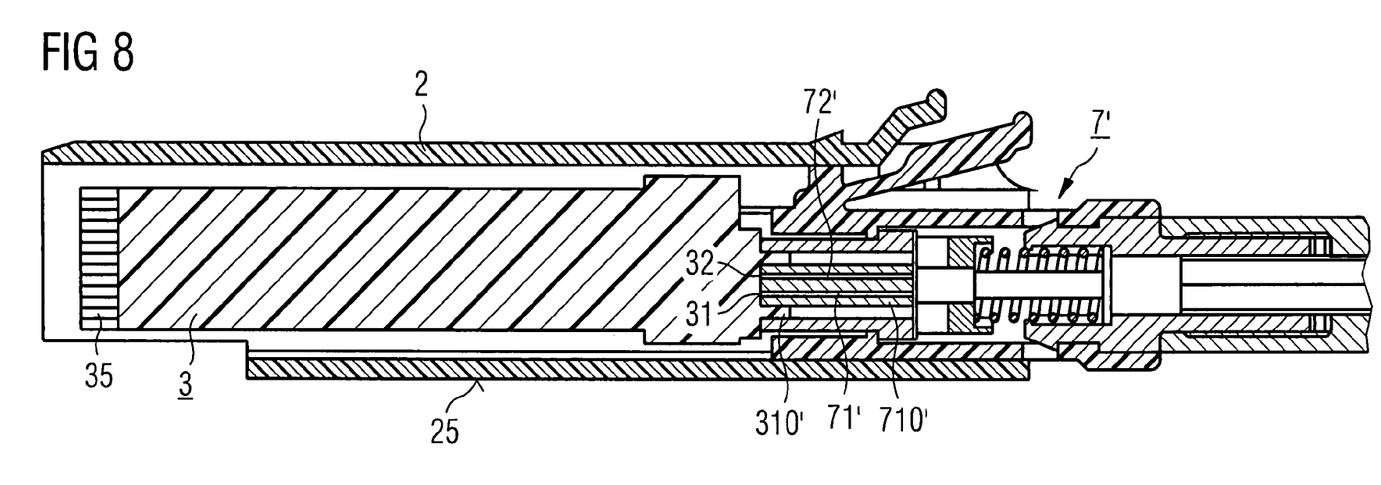
FIG. 8 shows a cross section through an optoelectronic module in a second embodiment, which uses an optical plug in which two optical waveguides are led in a single ferrule.
Figure 9:
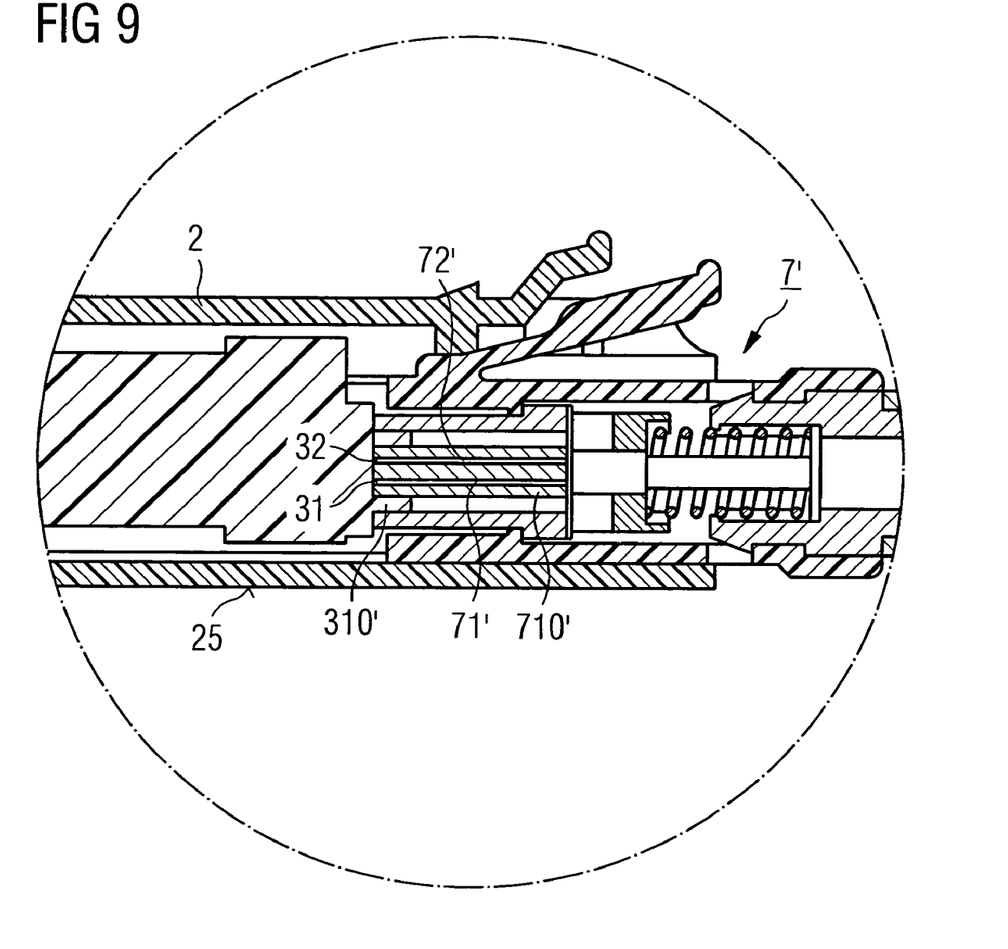
FIG. 9 shows an enlarged detail from FIG. 8.

FIGS. 8 and 9 show an optoelectronic module in a second embodiment, in the case of which a different form has been chosen for the optical plug 7'. The optical plug 7' is again a plug 7' carrying two optical waveguides 71', 72', but the two optical waveguides 71', 72' are led together in just a single ferrule 710' before the optical coupling region 31, 32 of the optoelectronic module 1. However, the two optical waveguides 71', 72' are led one above the other in the ferrule 710' as well, so that they can also be coupled into the optical coupling regions 31, 32 of the optoelectronic module that lie one above the other. The single ferrule 710' of this optical plug is received in an individual flange 310' within which the two optical contact regions lying one above the other are arranged.

The configuration of the invention is not restricted to the exemplary embodiments illustrated above. The person skilled in the art recognizes that numerous alternative embodiment variants exist which, despite their deviation from the exemplary embodiments described, make use of the teaching defined in the claims below. By way of example, it may be provided that other plug forms are used in which the two optical waveguides are arranged one above the other, or two plugs are used which can be inserted into the optoelectronic module one above the other.

The invention claimed is:

1. An optoelectronic module for optical signals of two optical data channels for arrangement on a main circuit board of an assembly, comprising:
   a housing comprising an underside for arrangement of the optoelectronic module on the main circuit board,
   a printed circuit board arranged in the housing, and
   a first optical coupling region and a second optical coupling region configured to optically couple to respective optical waveguides, wherein respective positions of the first and second coupling regions are determined at least in part by respective structural elements attached to the printed circuit board such that the first optical coupling region is arranged at a smaller distance from the underside of the housing than the second optical coupling region, and each of the structural elements is configured to physically interface with a respective optical waveguide ferrule.

2. The optoelectronic module according to claim 1, the optoelectronic module comprising a plugging axis and wherein the optical first and second coupling regions are arranged in a plane which lies perpendicular to a plane of the underside of the housing and parallel to the plugging axis of the optoelectronic module.

3. The optoelectronic module according to claim 1, the optoelectronic module comprising a plugging axis and wherein a plane of the printed circuit board, in the housing is oriented perpendicular to a plane of the underside of the housing and parallel to the plugging axis.

4. The optoelectronic module according to claim 1, wherein the housing comprises a receptacle configured to receive an optical plug carrying the first and second optical waveguides in such a way that a plane in which the the first and second optical waveguides lie is perpendicular to a plane of the underside of the housing.

5. The optoelectronic module according to claim 1, further comprising an optoelectronic transmission component and an optoelectronic reception component arranged on the printed circuit board, wherein the optoelectronic transmission component and the optoelectronic reception component are arranged one above the other with respect to the underside of the housing.

6. The optoelectronic module according to claim 1, wherein the printed circuit board comprises a contact region at an end thereof that is opposite to the first and second optical coupling regions, and wherein the contact region is configured to insert into a direct contact plug arranged on a main circuit board.

7. The optoelectronic module according to claim 6, wherein the contact region lies in a plane perpendicular to the underside of the housing.

8. The optoelectronic module according to claim 6, wherein the housing comprises a cutout for access to the contact region of the printed circuit board from outside the housing.

9. The optoelectronic module according to claim 1, wherein the housing of the optoelectronic module comprises a width less than or equal to half a width of a small form factor pluggable transceiver.

10. The optoelectronic module according to claim 1, wherein the housing comprises locking means for locking the optoelectronic module on the assembly associated with the main circuit board.

11. The optoelectronic module according to claim 10, wherein the locking means comprises an elastic locking lever and an engagement region, which is arranged on the locking lever and moves with the latter, wherein the engagement region is configured for engagement into an engagement opening of the assembly.

12. The optoelectronic module according to claim 11, wherein the locking lever is configured to pretension the engagement region in a locking direction.

13. The optoelectronic module according to claim 11, wherein the locking lever is wider at its actuable end region than a gap in the housing configured to receive a locking lever of an optical plug.

14. The optoelectronic module according to claim 10, further comprising an unlocking barrier on the locking lever, wherein said unlocking barrier is configured to prevent an unlocking of the housing from the assembly when an optical plug has been pushed in the housing.

15. The optoelectronic module according to claim 14, wherein the unlocking barrier is configured to engage an optical plug pushed into the housing of the optoelectronic module.

16. The optoelectronic module according to claim 14, wherein the unlocking barrier is arranged on a side of the locking lever which is opposite to the engagement region.

17. The optoelectronic module according to claim 10, further comprising a guide cage arranged on the assembly and configured to receive and lock the optoelectronic module therein by means of the locking means.

18. The optoelectronic module according to claim 1, wherein each of the structural elements is configured to removably receive a corresponding ferrule of an optical connector.

19. The optoelectronic module according to claim 1, wherein each of the structural elements comprises a flange that defines an opening configured to removably receive a portion of a corresponding ferrule of an optical connector.

20. The optoelectronic module according to claim 1, wherein each of the structural elements defines at least a portion of a respective optical coupling regions.

* * * * *

UNITED STATES PATENT AND TRADEMARK OFFICE
CERTIFICATE OF CORRECTION

| | | |
|---|---|---|
| PATENT NO. | : 7,347,634 B2 | Page 1 of 2 |
| APPLICATION NO. | : 10/913164 | |
| DATED | : March 25, 2008 | |
| INVENTOR(S) | : Günther et al. | |

It is certified that error appears in the above-identified patent and that said Letters Patent is hereby corrected as shown below:

Drawings
Sheet 5, please replace the current drawing of FIG. 5 with the following figure in which the "assembly 50" is depicted.

Signed and Sealed this
Fourth Day of January, 2011

David J. Kappos
*Director of the United States Patent and Trademark Office*

CERTIFICATE OF CORRECTION (continued)
U.S. Pat. No. 7,347,634 B2

Drawings
Sheet 8, please replace the current drawing of FIG. 8 with the following figure in which "optoelectronic module 1" is depicted.

Column 1
Line 19, add --so called-- before "optoelectronic"
Line 20, insert a --,-- after "modules"

Column 5
Line 33, remove the "," after "in"

Column 6
Line 15, change "axis" to --axis 100--
Line 15, change "of the" to --and--
Lines 57 and 65, change "55" to --50--

Column 8
Lines 25, 37 and 49, change "55" to --50--
Line 27, change "20" to --20 (FIG. 1)--

Column 9
Line 7, change "71, 72" to --71, 72 (FIGS. 2 and 3)--
Line 9, change "4" to --4 (FIG 4)--

Column 10
Line 13, remove the first "the"

Column 12
Line 9, change "regions" to --region--